July 6, 1954     R. L. PARKER     2,682,771
ICE COLLECTING MECHANISM
Filed Aug. 26, 1952     2 Sheets-Sheet 1
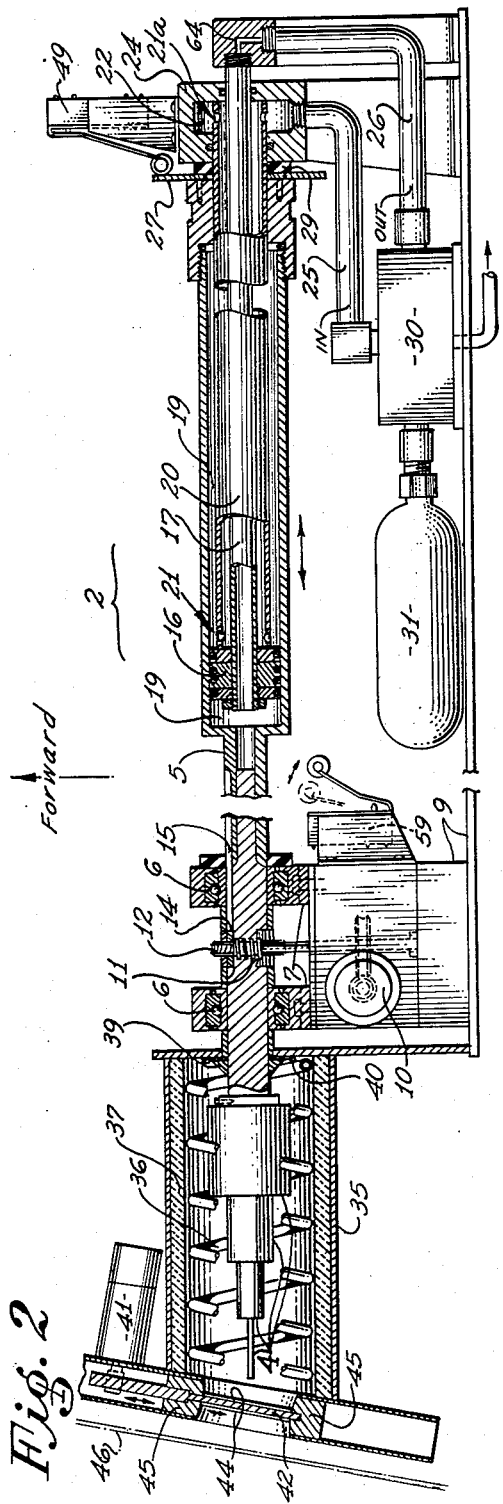
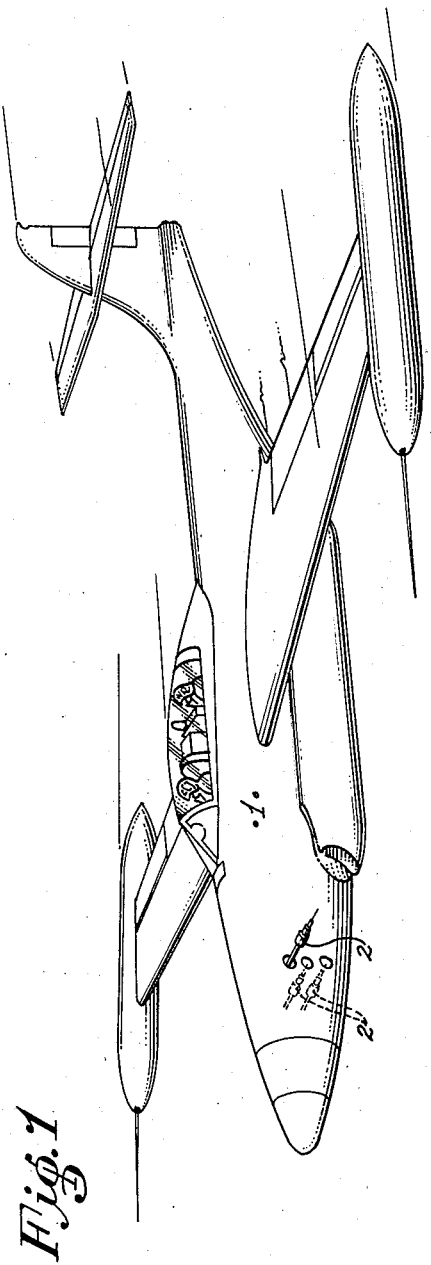
INVENTOR:
Richard L. Parker
By Herbert E. Metcalf
His Patent Attorney

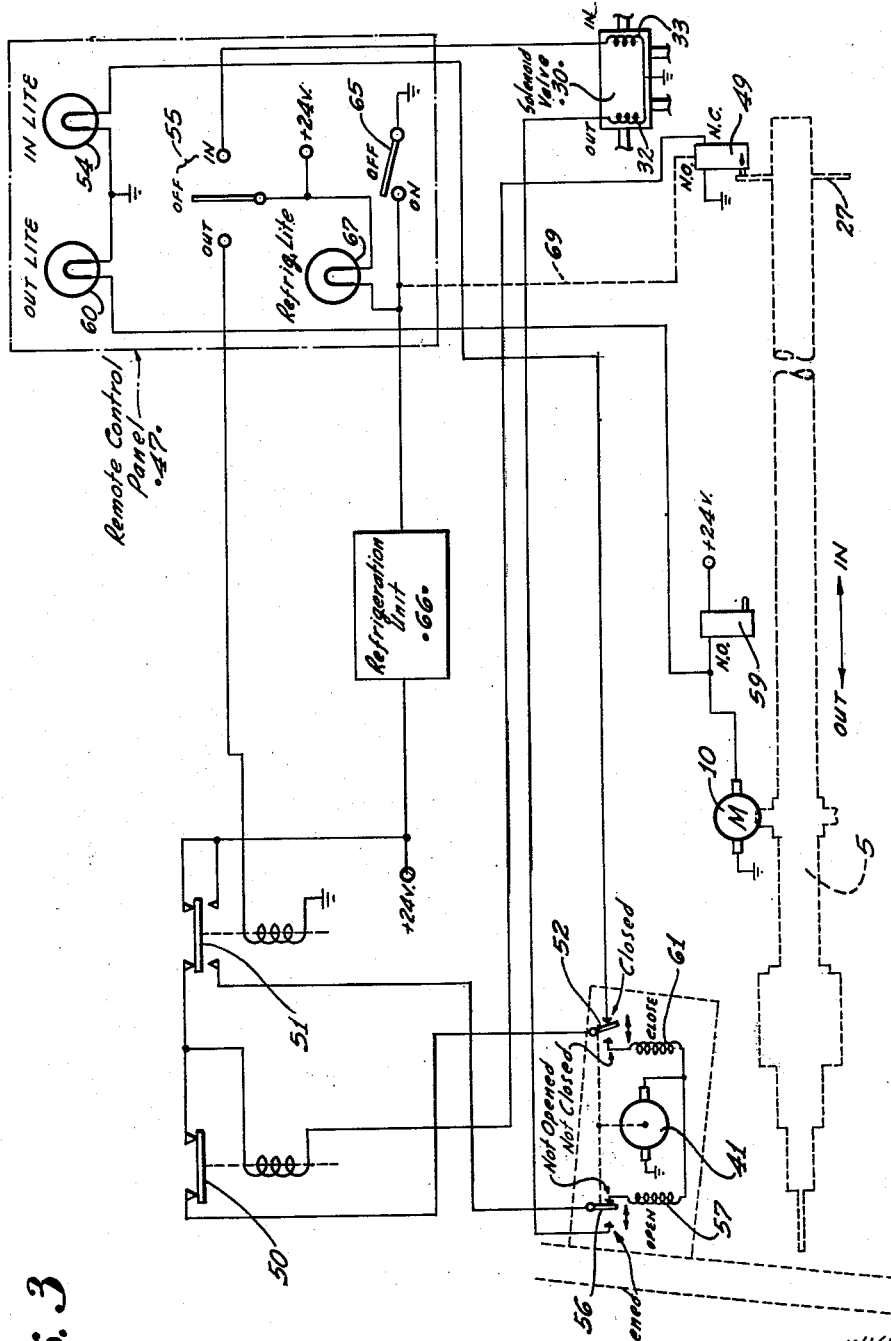

Patented July 6, 1954

2,682,771

UNITED STATES PATENT OFFICE 2,682,771

ICE COLLECTING MECHANISM

Richard L. Parker, Pacific Palisades, Calif., assignor to Northrop Aircraft, Inc., Hawthorne, Calif., a corporation of California Application August 26, 1952, Serial No. 306,449

15 Claims. (Cl. 73—170)

The present invention relates to aircraft flight testing equipment, and more particularly, to a remote-controlled automatic device for collecting and preserving samples of ice on metal cylinders held in the airstream during flight, under icing conditions.

For various reasons, it is often desirable to ascertain or prove the existence of icing conditions prevailing on an airplane in flight, and to accurately determine the severity of such conditions, such as by obtaining the water content of the air, rate of ice formation, and the like. This may be done at any particular time and place by extending collector probes into the airstream during flight for a predetermined length of time, and then measuring the amount of ice formed on those probes. Standard ice collecting cylinders of various sizes, and other collector probes, have been designed for this purpose. Further, it has been common practice to manually extend these cylinder assemblies, for example, to the exterior of the airplane, rotate them to secure an even coating of ice, manually retract them, and immediately measure and record the data before the ice melts.

However, in many instances, notably small or crowded aircraft, it is impossible to perform the above tests because of lack of space at a suitable place in the aircraft. The location must be where the rotating cylinders are exposed to the free airstream, and the available space in the interior of the airplane opposite such a location may not be large enough to accommodate the person and equipment required to make and record the tests.

Accordingly, it is an object of this invention to provide an ice collecting mechanism which can be remotely controlled to automatically extend from the airplane to the outside airstream and rotate the collecting device(s), and which can then, at will, be automatically retracted, stopped, and kept below freezing temperature until removed for measurements and recording after the flight. Several complete collecting units may be provided to obtain and determine icing conditions at several times during the flight. This will result in making it possible to obtain the desired icing data in virtually any aircraft, guided missile, rocket, or the like, in which it was heretofore impossible.

Briefly, this invention comprises a rotatable and extensible shaft carrying the test cylinders just inside the outer skin of the airplane. The shaft is hollow at one end and contains a stationary piston and hollow piston rod with fluid connections for extending and retracting the shaft under pressure. Around the ice cylinders just within the airplane is a refrigerated housing, and a power-operated end door is provided to close the refrigerator after the ice has been collected and retracted, together with sequence means for automatically opening and closing the door at the proper times in relation to the position of the main shaft. A motor, with a lengthwise sliding arrangement along said shaft, automatically rotates the shaft and cylinders while they are exposed for collecting ice. A remote operator's position carries all necessary controls and indicators for operation of the system.

My invention may be more fully understood by reference to the following detailed description of a preferred embodiment, together with the accompanying drawings wherein:

Figure 1 is a perspective view of an airplane in flight, showing the placement and use of three separately operable ice collecting mechanisms. In practice, any of the three may be used at any one time, as desired.

Figure 2 is a schematic diagram, partly sectional, showing the mechanical and pneumatic components and connections of one of the ice collecting units of the present invention.

Figure 3 is a schematic diagram of the electrical components and wiring of the system in Figure 2.

Referring first to Figure 1 for the detailed description, an airplane 1 is shown with three ice collecting units 2 positioned at 90° to the line of flight, extendable from the left side of the nose section. These units are preferably located one above another.

As shown in Figure 2, each ice collecting unit 2 includes a standard assembly of four sizes of ice collecting probes shown, in the form of cylinders 4, removably attached to the outer end of a main shaft 5. The shaft 5 is supported mainly by two bearings 6 mounted in bearing supports 7 from a mounting base 9 which forms a foundation for the entire unit. Bearings 6 allow rotation and reciprocation of the shaft 5. At some suitable place along the shaft 5, preferably between the two bearings 6, a shaft rotating motor 10 is mounted upon the base 9. Torque is transmitted from the motor 10 through a worm 11, gear 12, a key 14 fixed to the gear 12, and a lengthwise slot 15 on the shaft 5. Thus the shaft 5 can slide back and forth, while a rotating connection between the shaft and rotating motor 10 is always preserved. Cylinders 4 are preferably rotated at a speed of from 20 to 40 R. P. M.

For extension and retraction of the main shaft 5, the following mechanism is provided. The shaft 5 is hollow for a considerable portion of its inner end. Within the hollow shaft is a centrally apertured piston 16 fixed to the end of a stationary hollow piston rod 17, as shown in Figure 2. Since the hollow shaft forms an actuating cylinder chamber 19 closed at both ends, it is obvious that the shaft 5 may be extended by introducing pressure through the center of the piston 16 to react against the left end of the chamber, and that it may be retracted by pressure etxernal of the piston rod 17, between the piston 16 and the right end of the chamber 19. In the preferred embodiment as shown herein, the latter is accomplished by providing a tube 20 around the piston rod 17, this tube having a series of circumferential openings 21 at its left end and a similar series of openings 21a at its right end.

The right openings 21a communicate with an annular manifold 22 in a fixed support bracket 24 mounted from the base 9, and an "in" pressure line 25 is connected to the manifold 22. The hollow piston rod 17 continues through the bracket 24 to be connected with an "out" pressure line 26. An actuating plate 27, for purposes to be described later, and a resilient bumper 29 are connected to the right end of the hollow shaft 5, and it is therefore seen that the whole rotatable actuating cylinder chamber 19 and actuating plate 27 can move to the left, leaving the support bracket 24 and the pressure lines 25 and 26 in place.

Both pressure lines 25 and 26 are connected to the operating ports of a dual-solenoid control valve 30. The pressure port of this valve is connected to a source of pressure, such as a storage cylinder 31 containing air or nitrogen or the like at a pressure of 800 p. s. i. to 1800 p. s. i., for example. The return port exhausts to the atmosphere. When the "out" solenoid 32 (Figure 3) is energized, air pressure is admitted to the "out" pressure line 26 to extend the shaft 5 and ice collecting cylinders 4, and air on the right side of the piston 16 escapes through the "in" pressure line 25 and out the return port of the solenoid valve 30. When the "in" solenoid 33 (Figure 3) is energized, the shaft 5 is retracted by reverse action, and when both solenoids 32 and 33 are de-energized, air pressure is shut off in the valve 30 and pressure on each side of the piston 16 is exhausted.

Referring again to Figure 2, the left side of the main shaft 5 slidably passes through the right end of a refrigerator 35 containing a refrigerant coil 36, insulating blanket 37, and the necessary fittings (not shown). This right end is sealed by an ice breaker 39, which chips any ice off the shaft 5 as it is being retracted, and a packing seal 40. At the outer end of the refrigerator is provided a door motor 41, and a motor-operated sliding door 42 which slides over the opening of the refrigerator and is sealed by sealing rings 44 in a door frame 45. The door 42 is located just inside a cut-out in the outer skin 46 of the airplane 1.

Figure 3 shows a preferred electrical control system for each ice collecting unit 2, and operation of the entire unit will be described with reference especially to this figure, the parts being conventional electrical equipment.

A remote control panel 47 located at any place convenient to the operator, contains the controls for operating the system. Assuming that the shaft 5 is "in" and the door 42 closed, the equipment is ready to be put into use, when desired, to conduct a test to determine the rate of ice formation, and all parts are in the position illustrated. From this, it is seen that first position switch 49 (normally closed) is being held actuated in its open position by the actuating plate 27 on the shaft 5, and the single-pole relay 50 is now de-energized to complete a circuit from +24 volts through the top contacts of both relays 50 and 51 and "close" limit switch 52 in door motor 41 to the "in" indicating light 54, therefore lighting this light.

When manual control switch 55 is moved to the "out" position, double-pole relay 51 is energized to pull the relay conducting element down and apply +24 volts through "open" limit switch 56 to "open" winding 57 of door motor 41 to open the door 42. At the same time, "in" light 54 is turned out, due to breaking of contact of "close" limit switch 52 from the "closed" contact side, by the mechanical motion of the door and motor from its closed position. As soon as the door 42 is completely "open," limit switch 56 is tripped to the "opened" contact side, and +24 volts is thereby applied to "out" solenoid 32 in solenoid valve 30 to extend the shaft 5 as described above and place the ice cylinders 4 outside the airplane 1 in the airstream as shown in Figure 1. As the shaft 5 moves out, first position switch 49 closes and second position switch 59 (normally open) is closed upon arrival of shaft 5 at its extended position, which energizes rotating motor 10 and turns on "out" light 60. Upon seeing this light, the operator releases control switch 55 to its "off" position to relieve air pressure in the chamber 19, and thereby also energizes single-pole relay 50, since first position switch 49 is closed, to prevent closing of the door 42. The shaft 5 is now rotating, and friction and air loads insure that the shaft will remain extended.

After expiration of the desired ice-collecting interval, as timed, the operator will move control switch 55 "in" position to withdraw the cylinders 4 from the air stream into the refrigerator 35. With this action, "in" solenoid 33 is immediately energized and air pressure shifts the shaft 5 inwardly. At the same time, second position switch 59 opens to stop rotating motor 10 and turn off "out" light 60. When, but not until, the actuating plate 27 opens first position switch 49, single-pole relay 50 is de-energized to apply +24 volts through the top contacts of both relays 50 and 51 and through the "not closed" contact side of "close" limit switch 52 to "close" winding 61 of door motor 41, thus closing the door 42. Thereupon, "in" light 54 is turned on by tripping of "close" limit switch 52 to the "closed" side. The operator may then place control switch 55 in the "off" position again, and the cycle has been completed.

It will be noted that the relatively high air pressure, necessary to insure retraction of the iced shaft, would probably bang the shaft 5 against its retracted position with such impulse that the collected ice would be broken off. Therefore, an air cushion is provided due to a restrictor 64 placed in the passage of the "out" pressure line 26. This restrictor causes the air on the exhaust side of the piston 16 (when the shaft 5 is being retracted) to build up a back pressure which takes effect to practically stop the shaft as it nears its retracted position. It then progresses slowly the very short distance remaining to the retracted position. A similar restrictor of suitable size may be installed in the "in" pressure line 25, if desired, to limit the speed of outward travel of the shaft.

Just after the ice-collecting unit has been retracted and the refrigerator door 42 closed, the operator will close a refrigerator switch 65 on the remote control panel 47 to turn on the refrigerator system. An automatic refrigeration control unit 66 is thus energized, and a refrigerator light 67 comes on as an indicator. The refrigeration unit 66 may be any suitable system well known to those skilled in the art, preferably designed to maintain the ice cylinders 4 at a temperature not higher than 20° F., above zero. It may be a simple open system, for example, using a thermostatic expansion valve (not shown) and merely exhausting the refrigerant to the atmosphere after passing through the coil 36.

If desired, the refrigerator system may be made to start automatically when the shaft 5 reaches its retracted position, by connecting a wire 69 (shown in dotted lines) from the "normally open" contact of first position switch 49 to the ground side of the refrigeration unit 66 and refrigerator light 67, as shown in Figure 3. However, it will be noted that in this event, the refrigerator will be also operating before the shaft is extended to collect the ice.

The refrigerator 35 thereafter keeps the collected ice frozen until the cylinders 4 can be removed after the flight, for measurement of the ice thickness, weighing, and so forth. The cylinders may be removed from the refrigerator by operating the mechanism through the normal extension cycle and then removing the electrical supply voltage to prevent operation of the motor 10.

It is thus seen that the ice collecting mechanism is automatically and remotely controlled so that the required operations are accomplished without the operator being directly at hand, and the ice is automatically preserved after being brought inside the airplane. Therefore, it is not necessary to provide space at the ice unit for personnel to disassemble the ice cylinders and measure the ice coating immediately after its formation. A plurality of separate units, identical to the one described herein, can be installed, to collect a plurality of samples each at a different desired time during any one flight.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. An ice collecting mechanism comprising a rotatable and reciprocating shaft adapted at one end to carry a collector probe for exposure to icing atmosphere, the other end of said shaft being hollow for a considerable length to form a pressure cylinder, a stationary hollow piston rod entering said cylinder from said shaft other end and having an apertured piston secured around the inner end of said piston rod, closed cylinder end means attached to said hollow shaft and surrounding said piston rod, a fluid connection to the interior of said piston rod and another fluid connection to the inside of said cylinder around said piston rod and through said cylinder end means, a stationary refrigerator compartment coaxial with said shaft and positioned to surround said collector probe when said shaft is moved to a retracted position by pressure in one of said fluid connections, means for opening said refrigerator compartment at the outer end thereof to allow said collector probe to be extended to the outside when said shaft is moved outwardly by pressure in the other fluid connection, means for closing and sealing said compartment when said collector probe is positioned therein, means for rotating said shaft to allow formation of an even ice coating on said collector probe when extended into said atmosphere, and means for cooling said refrigerator compartment below freezing temperature to preserve said ice after retraction of said shaft.

2. An ice collecting mechanism comprising a rotatable and reciprocating mounting member adapted to carry a collector probe to be extended into surroundings where icing conditions prevail, in order to collect a sample of ice on said probe, means for extending and retracting said member, means for rotating said member in its extended position, and means for refrigerating said probe in the retracted position of said member.

3. An automatic remotely controlled ice collecting mechanism comprising a mounting member adapted to carry a collector probe to be exposed a predetermined time interval to ice-forming environment, remote-controlled power means for extending and retracting said member, power means actuated in response to extension of said member for rotating said member, and thermostatically controlled means for refrigerating said probe in the retracted position of said member.

4. Apparatus in accordance with claim 3 wherein said refrigerating means includes an insulated compartment surrounding said probe in said retracted position, and having a movable door closing said compartment, door power means connected to open and close said door, and sequence control means positioned to be mechanically tripped by said door in its closed position only, and by said member in its retracted position only, said sequence control means being operatively connected to the extension power means for said member and to said door power means to automatically open said door before extending said member and to automatically retract said member before closing said door.

5. An automatic remotely controlled ice collecting mechanism comprising a main shaft, means on one end of said shaft for mounting a collector assembly to be exposed and covered with ice in accordance with existing conditions to be measured, fluid power actuating means connected to extend and retract said shaft, electrically operated energizing means connected to control said power means, an electric shaft-rotating motor having a slidable and rotating connection with said shaft, control means for said rotating motor actuated in response to the position of said shaft whereby said motor is automatically energized in the extended shaft position but not in the retracted position, and thermostatically controlled means for refrigerating said collector assembly in the retracted position of said shaft.

6. Apparatus in accordance with claim 5 wherein said refrigerating means includes an insulated compartment surrounding said collector assembly in said retracted position, and having a movable door closing said compartment, a second electric motor connected to open and close said door, and sequence control switches connected in the circuits of said energizing means for said power actuating means and connected in the circuits of said door motor, said sequence control switches being mechanically operable and positioned to provide automatic opening of said door before extending said shaft and to provide automatic retraction of said shaft before closing said door.

7. An automatic remotely controlled ice collecting mechanism comprising a main shaft, a collector assembly removably connected to one end of said shaft for exposure to atmosphere having icing conditions, the other end of said shaft being hollow to form an actuating cylinder, a stationary hollow piston rod entering said cylinder coaxially and having an apertured piston secured around the inner end of said piston rod, cap means closing the inner end of said cylinder and slidable exteriorly of said piston rod, two separate fluid connections to the interior of said cylinder on opposite working sides of said piston, respectively, a double-acting electrical solenoid valve connected to said fluid connections to selectively apply extension and retraction pressure from a source of fluid under pressure, an electric shaft-rotating motor having a sliding and rotating connection with said shaft, an energizing switch for said rotating motor positioned to be actuated by said shaft in the extended position to operate said motor, but not actuated in the retracted position, and refrigerator means surrounding said collector assembly in said shaft retracted position, said refrigerator means being automatically controlled during operation to keep said collector assembly and collected ice thereon at a temperature below 32° F.

8. Apparatus in accordance with claim 7 wherein said refrigerator means comprises an insulated compartment around said collector assembly in said retracted position, and including a movable door positioned across the end of said compartment, a reversible electric door motor having driving connections with said door for opening and closing said door, and including spring-loaded sequence control switches in the circuits of said solenoid valve and said door motor, said sequence switches being mechanically operated and so positioned to cause automatic opening of said door before extension of said shaft and automatic retraction of said shaft before closure of said door.

9. Apparatus in accordance with claim 8 including a remote-located manual control switch for complete operation of said shaft, door, and rotating motor, said manual switch having an "out" and an "in" position, the electrical components for opening said door and extending said shaft being connected to said "out" position, the electrical components for retracting said shaft and closing said door being connected to said "in" position, and including a separate manual control switch for energizing and starting the cooling system of said refrigerator means at will.

10. In an airplane, means for collecting and preserving a sample of ice from the airstream to measure ice-forming conditions, which comprises a mounting member aligned substantially at 90° to the line of flight, a collector probe on which ice is to be formed mounted on the end of said member just inside a wall of said airplane, means for extending said member to place said probe in said airstream, means for rotating said member and probe while extended, means for retracting said member at will, and means for refrigerating said probe in the retracted position to preserve ice thereon until subsequent removal after a flight.

11. In an airplane, remotely controlled automatic means for obtaining a sample of airstream-collected ice on a collector probe to measure icing conditions, which comprises a mounting member aligned at substantially 90° to the line of flight and adapted to carry said collector probe on the end thereof just inside a wall of said airplane, remote-controlled two-directional power means for extending said member to place said probe in said airstream and for retracting said member at will, power means automatically actuated in response to extension of said member to rotate said member and probe while extended, and thermostatically regulated means for refrigerating said probe in the retracted position to preserve ice thereon until subsequent removal after a flight.

12. Apparatus in accordance with claim 11 wherein said refrigerating means includes an insulated stationary container positioned around said probe in said retracted position, a movable door positioned to close said container across the end of said probe when retracted, door power means connected to open and close said door, sequence control means positioned to be mechanically operated by said door at said open position and by said member at said retracted position, said sequence control means being operatively connected to said extension power means and to said door power means to automatically open said door before extending said member and to automatically retract said member before closing said door.

13. In an airplane, remotely controlled automatic means for obtaining a sample of airstream-collected ice on a collector probe to measure icing conditions during a flight, which comprises a mounting shaft rotatably and reciprocatively mounted in said airplane at substantially 90° to the line of flight and arranged to removably carry said collector probe coaxially at the end thereof just inside an opening in the outer skin of said airplane, two-directional fluid power actuating means connected to extend said shaft and said probe through said opening into said airstream and to retract said shaft, a double-acting electrical solenoid valve connected to control said fluid power means from a source of fluid under pressure, an electric shaft-rotating motor having a sliding and rotating connection with said shaft, and thermostatically regulated means for refrigerating said probe in the retracted position to preserve ice thereon until removal after said flight.

14. Apparatus in accordance with claim 13 including a movable door positioned to block said opening across the end of said probe when retracted, an electric door motor connected to open and close said door, a first two-position limit switch mechanically tripped by said door to one position when said door is completely open and to the other position at all other door positions, a second two-position limit switch mechanically tripped by said shaft to one position when said shaft is completely retracted and to the other position at all other shaft positions, a remote-located manual control switch having an "out" position and an "in" position, said first limit switch effectively connected to said "out" position to switch energization from the opening circuit of said door motor to the extension circuit of said solenoid valve when said door reaches open, and said second limit switch effectively connected in the closing circuit of said door motor to automatically delay energization of said closing circuit until said shaft travels from extended to retracted.

15. Apparatus in accordance with claim 14 including additional limit switch means connected in the operating circuit of said shaft-rotating motor and mechanically tripped by said shaft when extended, whereby said probe is automatically rotated when extended into said airstream.

References Cited in the file of this patent

UNITED STATES PATENTS

| Number | Name | Date |
|---|---|---|
| 2,427,778 | Gregg | Sept. 23, 1947 |
| 2,541,512 | Hahn | Feb. 13, 1951 |
| 2,585,604 | Vonnegut et al. | Feb. 12, 1952 |